(12) United States Patent
Tian et al.

(10) Patent No.: US 11,319,800 B2
(45) Date of Patent: May 3, 2022

(54) ONE-WAY FLOW MONITORING DEVICE AND OIL WELL LIQUID PRODUCTION CAPACITY CALCULATION METHOD

(71) Applicant: Yanxia Wang, Dongying (CN)

(72) Inventors: Haifeng Tian, Qufu (CN); Xinhua Li, Qufu (CN); Jianlin Wang, Dongying (CN); Qiang Kong, Qufu (CN)

(73) Assignee: Yanxia Wang, Shandong (CN)

( * ) Notice: Subject to any disclaimer, the term of this patent is extended or adjusted under 35 U.S.C. 154(b) by 0 days.

(21) Appl. No.: 16/127,246

(22) Filed: Sep. 11, 2018

(65) Prior Publication Data
US 2019/0242242 A1  Aug. 8, 2019

(30) Foreign Application Priority Data
Feb. 5, 2018 (CN) .......................... 201810109815.1

(51) Int. Cl.
| | |
|---|---|
| *E21B 47/10* | (2012.01) |
| *E21B 47/07* | (2012.01) |
| *E21B 47/26* | (2012.01) |
| *E21B 34/06* | (2006.01) |
| *E21B 47/06* | (2012.01) |
| *E21B 47/12* | (2012.01) |
| *G01F 1/28* | (2006.01) |

(52) U.S. Cl.
CPC .............. *E21B 47/10* (2013.01); *E21B 34/06* (2013.01); *E21B 47/06* (2013.01); *E21B 47/07* (2020.05); *E21B 47/12* (2013.01); *E21B 47/26* (2020.05); *G01F 1/28* (2013.01)

(58) Field of Classification Search
CPC .......... E21B 34/06; E21B 47/06; E21B 47/10; E21B 47/12; E21B 47/26; G01F 1/28
See application file for complete search history.

(56) References Cited

U.S. PATENT DOCUMENTS

| | | | | |
|---|---|---|---|---|
| 3,921,945 A | * | 11/1975 | Swaim ................... | B61F 9/005 246/169 R |
| 5,540,109 A | * | 7/1996 | Hobbs .................... | G01M 7/02 73/865 |
| 5,621,176 A | * | 4/1997 | Nagano ............... | G01L 19/0038 73/700 |
| 5,753,512 A | * | 5/1998 | Riall ..................... | G01N 35/04 422/549 |
| 6,884,341 B2 | * | 4/2005 | Ferguson ............. | G01N 1/2813 137/550 |

(Continued)

*Primary Examiner* — John Fitzgerald
(74) *Attorney, Agent, or Firm* — Hamre, Schumann, Mueller & Larson, P.C.

(57) ABSTRACT

A one-way flow monitoring device includes a mechanical part and a data collection part. The mechanical part is provided with the liquid inlet, the liquid outlet, a valve core, a valve base, a valve body, a valve cavity, a rubber shock absorption cushion, a spring, an indicating rod, a valve core stroke cavity, a cover plate, a base and a protective cover; the data collection part is provided with the temperature detection unit, the vibration detection unit, the pressure detection unit, the anti-disassembly detection unit, the valve core position detection unit, the period signal detection unit, the wireless transmission unit, the data storage unit and the data display unit, which are separately connected with the signal processing unit; and an independent power module 111 is provided.

15 Claims, 3 Drawing Sheets

(56) References Cited

U.S. PATENT DOCUMENTS

| | | | | |
|---|---|---|---|---|
| 7,178,330 B2* | 2/2007 | Kouzu | ............... | F01N 3/22 |
| | | | | 137/312 |
| 8,672,026 B2* | 3/2014 | van Zuilekom | ........ | E21B 34/08 |
| | | | | 166/264 |
| 9,939,419 B2* | 4/2018 | Ribeiro | ............ | E21B 47/117 |
| 2008/0127742 A1* | 6/2008 | Mueller | ............ | G01L 19/0015 |
| | | | | 73/756 |
| 2009/0266434 A1* | 10/2009 | Sagy | ............ | F16K 37/0083 |
| | | | | 137/845 |
| 2011/0041588 A1* | 2/2011 | Bailey | ............ | G08B 21/16 |
| | | | | 73/31.05 |
| 2011/0111489 A1* | 5/2011 | Beese | ............ | C12M 41/00 |
| | | | | 435/289.1 |
| 2011/0120234 A1* | 5/2011 | Bernard | ............ | G01M 3/3272 |
| | | | | 73/862.581 |
| 2014/0144209 A1* | 5/2014 | Smither | ............ | F02M 57/021 |
| | | | | 73/23.32 |

\* cited by examiner

ONE-WAY FLOW MONITORING DEVICE AND OIL WELL LIQUID PRODUCTION CAPACITY CALCULATION METHOD

CROSS REFERENCE TO RELATED APPLICATIONS

This non-provisional patent application is based upon and claims priority to Chinese Patent Application No. 201810109815.1, filed on Feb. 5, 2018, the entire contents of which are incorporated herein by reference.

TECHNICAL FIELD

The invention belongs to the technical field of oilfield exploitation monitoring and particularly to a One-way flow monitoring device and oil well liquid production capacity calculation method.

BACKGROUND

At present, there are mainly two measurement methods for the liquid production capacity of oil wells in an oil production process of oilfields. One method is an oilfield weighing measurement device which calculates the liquid production capacity of an oil well through a weighing sensor and a turnover frequency of a skip bucket. When such method is adopted for measurement, only discontinuous measurement can be done. The measurement is adopted every three days or according to other measurement rules for calculation of the liquid production capacity of the oil well; as measurement cannot be done continuously, a big measurement error of the liquid production capacity of the oil well results, and when the oil well is abnormal, problems cannot be discovered in time. The other method is to calculate the liquid production capacity of the oil well based on an indicator diagram of the oil well; The principle is to calculate based on an effective stroke line of the incoming liquid of the indicator diagram of the oil well; The indicator diagram is collected every hour or two hours; the daily average liquid production capacity of the oil well is calculated based on the indicator diagrams collected throughout the day; and relative to the measurement precision of the first method, the measurement precision of the second method is greatly improved; when an oil pipe leaks, the leakage condition of the oil pipe cannot be judged from the liquid production capacity calculated through the indicator diagrams, and the measurement method is invalid for heavy oil wells and special wells.

SUMMARY

A device for one or more One-Way Flow Monitoring Device, the device comprising a mechanical part and a data collection part; a liquid inlet and a liquid outlet of the mechanical part of the One-way flow monitoring device are connected in series in a pipeline flow path through a flange or a welding mode according to an oil well pipeline flow path direction; the mechanical part is provided with the liquid inlet, the liquid outlet, a valve core, a valve base, a valve body, a valve cavity, a rubber shock absorption cushion, a spring, an indicating rod, a valve core stroke cavity, a cover plate, a base and a protective cover; the liquid inlet and the liquid outlet are connected with each other through the valve body; the valve base is located at the interior of the valve body and is in contact connection with the valve body; the valve base enables the liquid inlet and the liquid outlet to communicate with each other, and the valve base can be disassembled from the valve body; the cover plate is located at the top part of the valve body, the base is fixedly connected above the cover plate, the base is internally provided with the vale core stroke cavity, and the protective cover is arranged above the base; the interior of the valve base is the valve cavity; the valve core, the valve base, the rubber shock absorption cushion, the spring and the indicating rod are located in the valve cavity; the valve core is located at the bottom of the valve cavity, can slide up and down at the interior of the valve cavity along the axial line, is in contact sealing with the valve base and can be disassembled from the valve base; the rubber shock absorption cushion is located at the upper part of the valve core and is in contact with the valve core; the indicating rod is located at the upper part of the rubber shock absorption cushion and is connected with the rubber shock absorption cushion; the indicating rod penetrates the spring and the cover plate sequentially and enters the valve core stroke cavity; the data collection part is arranged at the interior of the protective cover; the data collection part is provided with the temperature detection unit, the vibration detection unit, the pressure detection unit, the anti-disassembly detection unit, the valve core position detection unit, the period signal detection unit, the wireless transmission unit, the data storage unit and the data display unit, which are separately connected with the signal processing unit; and an independent power module is provided; the base is provided with a detecting hole required by the temperature detection unit, a fixing hole required by the pressure detection unit, a detecting hole required by the valve core position detection unit and a mounting hole required by the anti-disassembly detection unit; the valve core position detection unit can detect the position of the valve core by adopting the Hall sensor, the metal detector, the photoelectric switch and the pressure sensor; and the period signal detection unit can adopt the Hall sensor and the ultrasonic waves.

Wherein the temperature detection unit is connected with the signal processing unit and is used for detecting the liquid temperature in the valve cavity.

Wherein the vibration detection unit is connected with the signal processing unit and is used for detecting the vibration condition of the device.

Wherein the pressure detection unit is connected with the signal processing unit and is used for detecting the pressure in the valve cavity.

Wherein the anti-disassembly detection unit is connected with the signal processing unit and is used for detecting the disassembly condition of the protective cover.

Wherein the valve core position detection unit, connected with the signal processing unit, is used for detecting the movement condition of the valve core.

Wherein the wireless transmission unit is connected with the signal processing unit and is used for realizing wireless data transmission.

Wherein the storage unit is connected with the signal processing unit and is used for realizing data storage.

Wherein the data display unit is connected with the signal processing unit and is used for displaying the collected data.

Wherein the period signal detection unit, connected with the signal processing unit, is used for detecting the period of the oil pumping unit.

Wherein the power module provides a power source required for working to the temperature detection unit, the vibration detection unit, the pressure detection unit, the anti-disassembly detection unit, the valve core position detection unit, the period signal detection unit, the wireless transmission unit, the data storage unit, the data display unit and the signal processing unit.

Preferably, wherein the signal processing unit can adopt a PLC and a single-chip machine.

Preferably, wherein the valve core stroke cavity is communicated with the valve body through a gap between the cover plate and the indicating rod.

Preferably, wherein the detecting hole required by the temperature detection unit is not communicated with the valve cavity.

Preferably, wherein the fixing hole required by the pressure detection unit is communicated with the valve cavity.

Preferably, wherein the detecting hole required by the valve core position detection unit is not communicated with the valve cavity, but is close to the valve core stroke cavity.

Preferably, wherein the rubber shock absorption cushion contacts the valve core under the action of the spring.

Preferably, wherein the valve core and the valve base can be made of stainless steel and a ceramic material.

Preferably, wherein the power module is located in the protective cover and can be a battery.

A method for Oil Well Liquid Production Capacity Calculation, wherein (1) the One-way flow monitoring device, which has One-way liquid flow characteristics, can distinguish whether the oil pumping unit is in an upstream or a downstream process through the period signal detection unit; in the upstream process of the oil pumping unit, liquid enters the liquid inlet of the One-way flow monitoring device from the oil pipe; when the liquid at the liquid inlet is compressed and pressurized until the force value enabling the valve core moves upwards is realized, the valve core moves upwards; and the upward movement state of the valve core is detected by the valve core position detection unit;

(2) the signal processing unit detects a time accumulation value of the valve core; which is in the upward movement state, in real time through the valve core position detection unit;

(3) a time specific value taken by the liquid output of the oil pumping unit in a single period is calculated by dividing the time accumulation value of the valve core, which is in the upward movement state, and the period of the oil. pumping unit; an efficient stroke for the liquid inlet of the oil pump is calculated based on the time specific value; and a single liquid production
based on the pumping diameter of the oil pumping unit, the stroke of the oil pumping unit, the period of the oil pumping unit, and oil gas value ratio and the time accumulation value of the valve core in the upward movement state during the up stroke;

$$Q_{U_p}(i) = \frac{\pi D^2 L t_{1i}}{2T} \times B0 \times 10^{-6} \quad \text{Formula 1}$$

wherein, Qup(i) is the liquid production capacity of the pumping unit during the up stroke at the i time, and the unit is m3;

D is the pumping diameter of the oil pumping unit and the unit is mm;

L is the stroke of the oil pump and the unit is m;

t1i is the time accumulation value of the valve core which is in the upward movement state during the up stroke of the oil pumping unit at the i time, and the unit is s;

T is the period of the oil pumping unit, and the unit is s; and

B0 is the oil as volume ratio.

(4) in a downstream process of the oil pumping unit, an oil pumping rod which enters a mixed liquid may also result in liquid output of the oil well; the liquid enters the liquid inlet of the One-way flow monitoring device through the oil pipe; when the liquid at the liquid inlet is compressed and pressurized until the force value enabling the valve core moves upwards is realized, the valve core moves upwards; and the upward movement state of the valve core is detected by the valve core position detection unit;

(5) the signal processing unit detects the time accumulation value of the valve core, which is in the upward movement state, in real time through the valve core position detection unit;

(6) a time specific value taken by the liquid output of the oil pumping unit in a single period is calculated by dividing the time accumulation value of the valve core which is in the upward movement state and the period of the oil pumping unit; an efficient stroke for the liquid inlet of the oil pump is calculated based on the time specific value; and the single liquid production capacity during the down stroke of the oil pump can be calculated according to Formula 2 based on the pumping diameter of the oil pumping unit, the stroke of the oil pumping unit, the period of the oil pumping unit, an oil gas value ratio and the time accumulation value of the valve core in the upward movement state during the down stroke;

$$Q_{Down}(i) = \frac{\pi d^2 L t_{2i}}{2T} \times B0 \times 10^{-6} \quad \text{Formula 2}$$

wherein, Qdown(i) is the liquid production capacity of the oil pumping unit during the down stroke at the i time, and the unit is m3;

d is the diameter of the oil pumping rod and the unit is mm;

L is the stroke of the oil pump and the unit is m;

t2i is the time accumulation value of the valve core which is in the upward movement state during the down stroke of the oil pumping unit at the i time, and the unit is s;

T is the period of the oil pumping unit, and the unit is s; and

B0 is the oil gas volume ratio.

(7) the liquid production capacity of the oil well of the oil pumping unit in a single period can be calculated based on a Formula 3, which is obtained by combining Formula 1 and Formula 2:

$$Q(i) = \frac{\pi L B0}{2T} \times (D^2 t_{1i} + d^2 t_{2i}) \times 10^{-6} \quad \text{Formula 3}$$

wherein, Q(i) is the liquid production capacity of the oil pumping unit in the i period, and the unit is m3;

D is the pumping diameter of the oil pumping unit, and the unit is mm;

d is the diameter of the oil pumping rod and the unit is mm;

L is the stroke of the oil pumping unit and the unit is m;

T is the period of the oil pump and the unit is s;

B0 is the oil gas volume ratio;

t1i is the time accumulation value of the valve core 210 which is in the upward movement state during the up stroke of the oil pumping unit at the i time, and the unit is s; and t2i is the time accumulation value of the valve core 210 which is in the upward movement state during the down stroke of the oil pumping unit at the i time, and the unit is s;

(8) the daily liquid production capacity of the oil well can be calculated through Formula 4 based on the liquid production capacity of the oil pumping unit in a single period;

$$Q = \sum_{i=1}^{i=M} Q(i) \qquad \text{Formula 4}$$

wherein, Q is the daily liquid production capacity of the oil well, and the unit is m3;

Q(i) is the liquid production capacity of the oil well when the oil pumping unit is in the i-th period, and the unit is m3; and M is the number of periods of the oil pumping unit within a day.

Therein the working state of the oil pump can be judged by using the calculated liquid production capacity; and the work state includes pump leakage, oil pipe leakage, pump clamping, and well stop.

Compared with the prior art, the invention has the beneficial effects that the One-way flow monitoring device can collect temperature and pressure data in real time and replaces an oil pressure sensor, the collected data not only can be displayed on the site in real time, but also can be transmitted wirelessly; a worker can check and implement the device working state in real time, can increase an on-site problem response speed and can operate on site according to an operational process of a check valve; holing of a pipeline for installation of an oil pressure sensor is no longer necessary and the on-site operational process is simplified; the implementation mode of movement detection of the valve core is simple, the One-way flow monitoring device is easy to operate, can adapt to different oil well conditions, can calculate the liquid production capacity of oil wells in real time, can greatly improve the measuring accuracy of the liquid production capacity of oil wells, can discover problems in time when the liquid production capacity of the oil well is abnormal, and increases an on-site abnormal problem processing speed.

DETAILED DESCRIPTION

To make the objectives, technical solutions and advantages of the invention clearer, a detailed description of the present invention will be given below, in combination with the accompanying drawings and specific embodiments of the invention.

Figure 1:
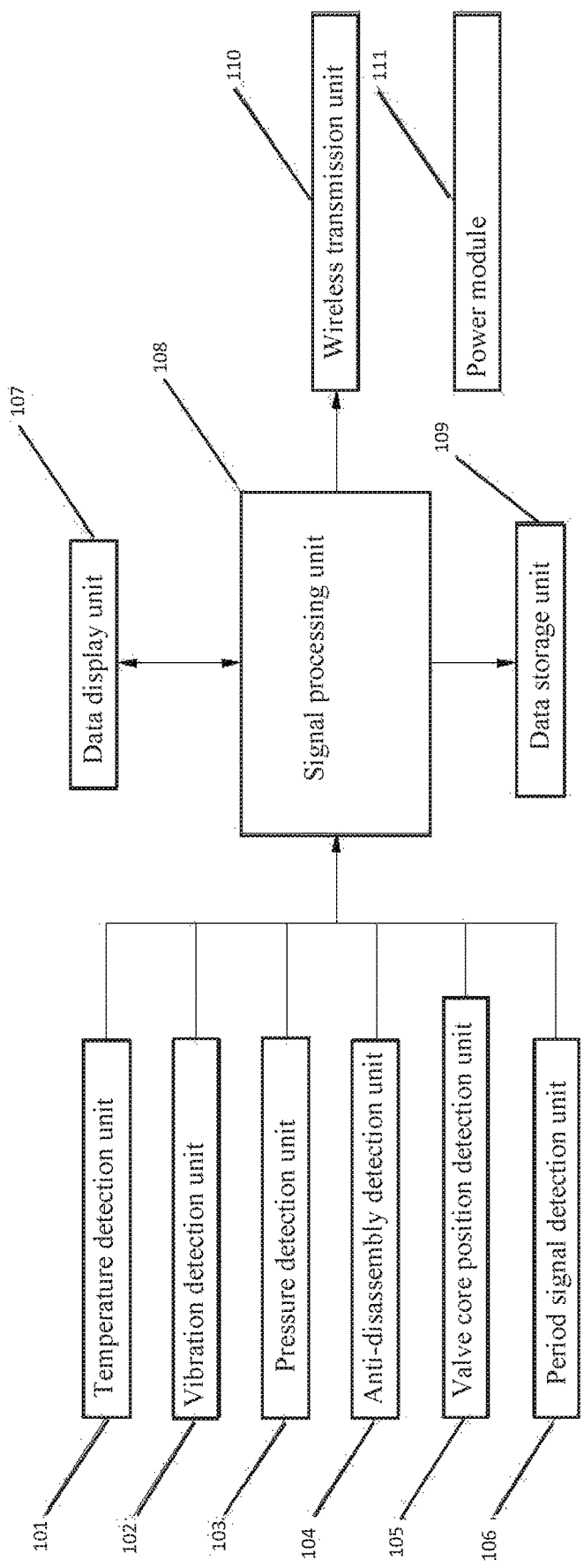
FIG. 1 shows a schematic diagram of the electric connection of the data collection part of an embodiment.

In the FIG. 1, the schematic diagram of the electric connection of the data collection part of the invention is mainly introduced. The data collection part is provided with a temperature detection unit 101, a vibration detection unit 102, a pressure detection unit 103, an anti-disassembly detection unit 104, a valve core position detection unit 105, a period signal detection unit 106, a wireless transmission unit 110, a data storage unit 109 and a data display unit 107; the temperature detection unit 101 is connected with a signal processing unit 108 and is used for detecting a liquid temperature in a valve body 211 or a valve cavity 213; the vibration detection unit 102 is connected with the signal processing unit 108 and is used for detecting a vibration condition of the device; the pressure detection unit 103 is connected with the signal processing unit 108 and is used for detecting a pressure in the valve cavity 213; the anti-disassembly detection unit 104 is connected with the signal processing unit 108 and is used for detecting a disassembly condition of a protective cover 218; the valve core position detection unit 105, connected with the signal processing unit 108, is used for detecting a movement condition of a valve core 210 and can detect the position of the valve core 210 by adopting the Hall sensor, a metal detector, a photoelectric switch and a pressure sensor; the period signal detection unit 106, connected with the signal processing unit 108, is used for detecting a period of the oil pumping unit and can adopt the Hall sensor and ultrasonic waves; the wireless transmission unit 110 is connected with the signal processing unit 108 and is used for realizing wireless data transmission; the storage unit 109 is connected with the signal processing unit 108 and is used for realizing data storage; the data display unit 107 is connected with the signal processing unit 108 and is used for displaying the collected data; an independent power module 111 is provided to provide a power source required for working to the temperature detection unit 101, the vibration detection unit 102, the pressure detection unit 103, the anti-disassembly detection unit 104, the valve core position detection unit 105, the period signal detection unit 106, the wireless transmission unit 110, the data storage unit 109, the data display unit 107 and the signal processing unit 108. The power module 111 may be a battery.

Figure 2:
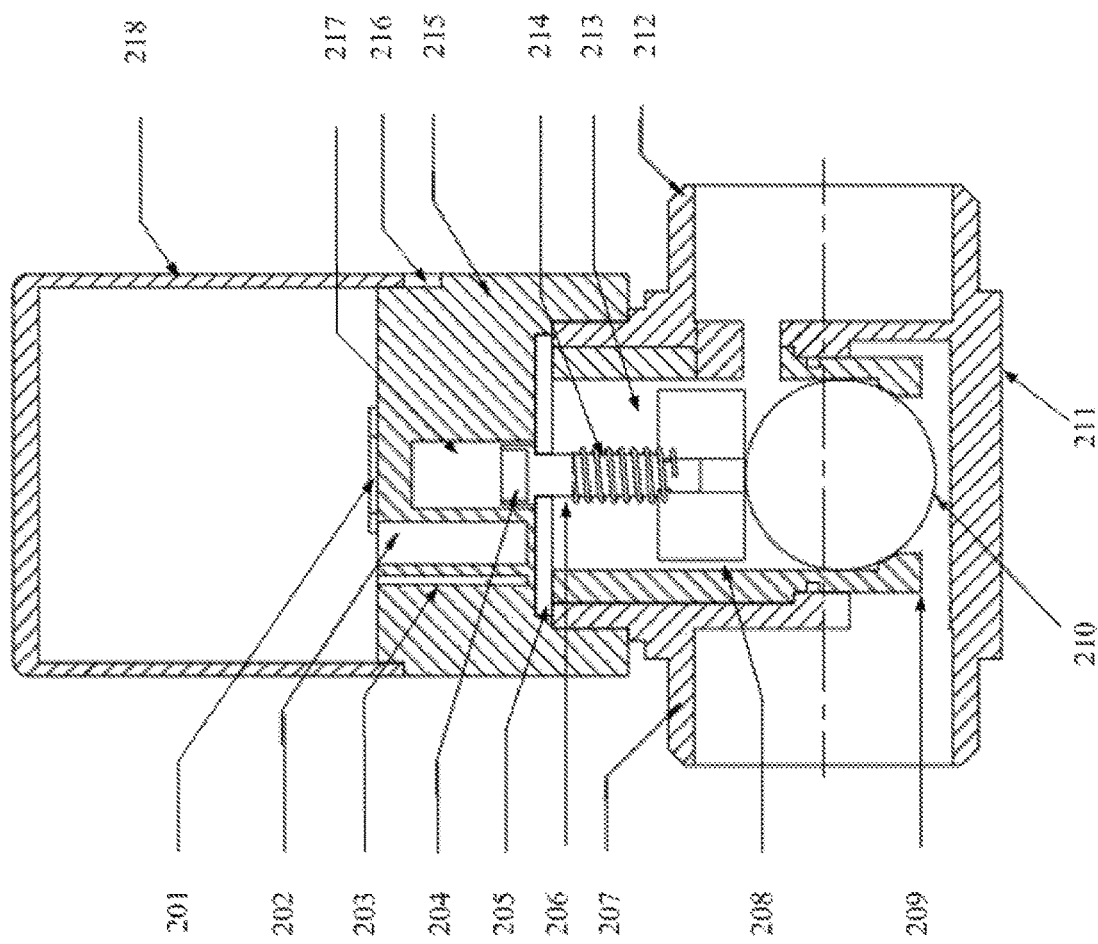
FIG. 2 shows a structural schematic diagram based on a Hall sensor.

Now, the structure of detecting the working state of the device by adopting the Hall sensor is described in detail, in combination with FIG. 1 and FIG. 2.

An One-way flow monitoring device comprises a mechanical part and a data collection part. A liquid inlet 207 and a liquid outlet 212 of the mechanical part of the One-way flow monitoring device are connected in series in a pipeline flow path through a flange or a welding mode according to an oil well pipeline flow path direction. The mechanical part is provided with the liquid inlet 207, the liquid outlet 212, a valve core 210, a valve base 209, a valve body 211, a valve cavity 213, a rubber shock absorption cushion 208, a spring 214, an indicating rod 206, a valve core stroke cavity 217, a cover plate 205, a bottom base 215 and a protective cover 218; the liquid inlet 207 and the liquid outlet 212 are connected with each other through the valve body 211; the valve base 209 is located at the interior of the valve body 211 and is in contact connection with the valve body 211; the valve base 209 enables the liquid inlet 207 and the liquid outlet 212 to communicate with each other, and the valve base 209 can be disassembled from the valve body 211; the cover plate 205 is located at the top part of the valve body 211, the bottom base 215 is fixedly connected above the cover plate 205, the bottom base 215 is internally provided with the valve core stroke cavity 217, and the protective cover 218 is arranged above the bottom base 215; the interior of the valve base 209 is the valve cavity 213; the valve core 210, the valve base 209, the rubber shock absorption cushion 208, the spring 214 and the indicating rod 206 are located in the valve cavity 213; the valve core 210 is located at the bottom of the valve cavity 213, can slide up and down at the interior of the valve cavity 213 along the axial line, is in contact sealing with the valve base 209 and can be disassembled from the valve base 209; the rubber shock absorption cushion 208 is located at the upper part of the valve core 210 and. is in contact with the valve core 210; the indicating rod 206 is located at the upper part of the rubber shock absorption cushion 208 and is connected with the rubber shock absorption cushion 208 the indicating rod 206 penetrates the spring 214 and the cover plate 205 sequentially and enters the valve core stroke cavity 217; the data collection part is arranged at. the interior of the protective cover 218; the data collection part is provided with the temperature detection unit 101, the vibration detection unit 102, the pressure detection unit 103, the anti-disassembly detection unit 104, the valve core position detection unit 105, the period signal detection unit 106, the wireless transmission unit 110, the data storage unit 109 and the data display unit 107, which are separately connected with the signal processing unit 108; and an independent power module 111 is provided; the bottom base 215 is provided with a detecting hole 203 required by the temperature detection unit 101, a fixing hole 201 required by the pressure detection unit 103, a detecting hole 202 required by the valve core position detection unit 105 and a mounting hole 216 required by the anti-disassembly detection unit 104; the valve core position detection unit 105 can detect the position of the valve core 210 by adopting the Hall sensor, the metal detector, the photoelectric switch and the pressure sensor; and the period signal detection unit 106 can adopt the Hall sensor and the ultrasonic waves.

The temperature detection unit 101 is connected with the signal processing unit 108 and is used for detecting the liquid temperature in the valve cavity 213; the vibration detection unit 102 is connected with the signal processing unit 108 and is used for detecting the vibration condition of the device; the pressure detection unit 103 is connected with the signal processing unit 108 and is used for detecting the pressure in the valve cavity 213; the anti-disassembly detection unit 104 is connected with the signal processing unit 108 and is used for detecting the disassembly condition of the protective cover 218; the valve core position detection unit 105, connected with the signal processing unit 108, is used for detecting the movement condition of the valve core 210; the period signal detection unit 106, connected with the signal processing unit 108, is used for detecting the period of the oil pumping unit and can adopt the Hall sensor and ultrasonic waves; the wireless transmission unit 110 is connected with the signal processing unit 108 and is used for realizing wireless data transmission; the storage unit 109 is connected with the signal processing unit 108 and is used for realizing data storage; the data display unit 107 is connected with the signal processing unit 108 and is used for displaying the collected data; the power module 111 provides a power source required for working to the temperature detection unit 101, the vibration detection unit 102, the pressure detection unit 103, the anti-disassembly detection unit 104, the valve core position detection unit 105, the period signal detection unit 106, the wireless transmission unit 110, the data storage unit 109, the data display unit 107 and the signal processing unit 108.

Preferably, the signal processing unit 107 can adopt a PLC and a single-chip machine.

Preferably, the valve core stroke cavity 217 is communicated with the valve body 211 through a gap between the cover plate 205 and the indicating rod 206.

Preferably, the detecting hole 203 required by the temperature detection unit 101 is not communicated with the valve cavity 213; the fixing hole 201 required by the pressure detection unit 103 is communicated with the valve cavity 213; and the detecting hole 202 required by the valve core position detection unit 105 is not communicated with the valve cavity 213, but is close to the valve core stroke cavity 217.

Preferably, the rubber shock absorption cushion 208 contacts the valve core 210 under the action of the spring 214.

Preferably, the valve core 210 and the valve base 209 can be made of stainless steel and a ceramic material.

Preferably, the power module 111 is located in the protective cover 218 and can be a battery.

In addition, the valve core position detecting unit 105 can detect the position of the valve core 210 by adopting the Hall sensor, the metal detector, the photoelectric switch and the pressure sensor; the valve core detection unit 105 detecting the position of the valve core 210 by adopting the Hall sensor is described in the embodiment, and the description is no longer carried out here. If the position of the valve core 210 is detected by adopting a metal detector, the metal detector can be directly installed at the top part of the valve core stroke cavity 217; when moving upwards, the valve core 210 drives the indicating rod 206 to move upwards; the indicating rod 206 moves upwards to be close to the metal detector; after detecting a switching signal, the metal detector sends the switching signal to the signal processing unit 108, and the signal processing unit 108 obtains the movement condition of the valve core 210 through the switching signal; if the position of the valve core 210 is detected by adopting a photoelectric switch, the photoelectric switch shall adopt a U-shaped structure and can be installed at the top part of the valve core stroke cavity 217; when the indicating rod 206 moves upwards to shield light, the photoelectric switch gives out a switching signal and sends the switching signal to the signal processing unit 108; the signal processing unit 108 obtains the movement condition of the valve core 210 through the switching signal; if the position of the valve core 210 is detected by adopting a pressure sensor, the pressure sensor is installed at the upper part of the indicating rod 206 and contacts the indicating rod 206 through the matched spring 214; when moving upwards, the valve core 210 enables the indicating rod 206 to move upwards and compresses the spring 214, the functional force of the spring 214 is fed back to the stressed surface of the pressure sensor; the pressure sensor sends the signal to the signal processing unit 108, and the signal processing unit 108 can judge the movement condition of the indicating rod 206 and further can obtain the movement condition of the valve core 210. The period signal detection unit 106, connected with the signal processing unit 108, is used for detecting the period of the oil pumping unit and can adopt the Hall sensor and ultrasonic waves; the period signal detection unit 106 can provide a period signal which is convenient to distinguish the upward movement of the valve core 210 during the up stroke and the down stroke, and the liquid production capacity of the oil well can be calculated based on the adoption of different pumping diameters and different rod diameters in different processes; if the period of the oil pumping unit is detected by adopting the Hall sensor, the magnet 204 is installed at a rope suspender, the Hall sensor is arranged at a packing box so as to bring convenience for real-time detection; when the magnet 204 is close to the Hall sensor, the Hall sensor outputs a low electric level signal; when the magnet 204 is far away from the Hall sensor, the Hall sensor outputs a high electric level, the signal processing unit 108 can distinguish the liquid output condition of the oil pumping machine during the up stroke and the down stroke based on the detected signal; and if the period of the oil pumping machine is detected by adopting the ultrasonic waves, an ultrasonic wave detection unit is arranged at the packing box, the signal processing unit 108 detects the position of the rope suspender through the ultrasonic waves and then calculates the period of the oil pumping unit and can also distinguish the liquid output condition of the oil pumping unit during the up stroke and the down stroke.

After the position change of the valve core 210 is detected based on the methods mentioned above, the liquid production capacity of the oil well can be calculated; and the steps of calculating the liquid production capacity of the oil well are as follows:

(1) the One-way flow monitoring device, which has One-way liquid flow characteristics, can distinguish whether the oil pumping unit is in an upstream or a downstream process through the period signal detection unit 106; in the upstream process of the oil pumping unit, liquid enters the liquid inlet 207 of the One-way flow monitoring device from the oil pipe; when the liquid at the liquid inlet 207 is compressed and pressurized until the force value enabling the valve core 210 moves upwards is realized, the valve core 210 moves upwards; and the upward movement state of the valve core 210 is detected by the valve core position detection unit 105;

(2) the signal processing unit 108 detects a time accumulation value of the valve core 210, which is in the upward movement state, in real time through the valve core position detection unit 105;

(3) a time specific value taken by the liquid output of the oil pumping unit in a single period is calculated by dividing the time accumulation value of the valve core 210, which is in the upward movement state, and the period of the oil pumping unit; an efficient stroke for the liquid inlet of the oil pump is calculated based on the time specific value; and a single liquid production capacity during the up stroke of the oil pumping unit can be calculated according to Formula 1 based on the pumping diameter of the oil pumping unit, the stroke of the oil pumping unit, the period of the oil pumping unit, and oil gas value ratio and the time accumulation value of the valve core 210 in the upward movement state during the up stroke;

$$Q_{U_p}(i) = \frac{\pi D^2 L t_{1i}}{2T} \times B0 \times 10^{-6} \quad \text{Formula 1}$$

wherein, Qup(i) is the liquid production capacity of the oil pumping unit during the up stroke at the i time, and the unit is m3;

D is the pumping diameter of the oil pumping unit and the unit is mm;

L is the stroke of the oil pump and the unit is m;

t1i is the time accumulation value of the valve core 210 which is in the upward movement state during the up stroke of the oil pumping unit at the i time, and the unit is s;

T is the period of the oil pumping unit, and the unit is s; and

B0 is the oil gas volume ratio.

(4) in a downstream process of the oil pumping unit, an oil pumping rod which enters a mixed liquid may also result in liquid output of the oil well; the liquid enters the liquid inlet 207 of the One-way flow monitoring device through the oil pipe; when the liquid at the liquid inlet 207 is compressed and pressurized until the force value enabling the valve core 210 moves upwards is realized, the valve core 210 moves upwards; and the upward movement state of the valve core 210 is detected by the valve core position detection unit 105;

(5) the signal processing unit 108 detects the time accumulation value of the valve core 210, which is in the upward movement state, in real time through the valve core position detection unit 105;

(6) a time specific value taken by the liquid output of the oil pumping unit in a single period is calculated h dividing the time accumulation value of the valve core 210 which is in the upward movement state and the period of the oil pumping unit; an efficient stroke for the liquid inlet of the oil pump is calculated based on the time specific value; and the single liquid production capacity during the down stroke of the oil pump can be calculated according to Formula 2 based on the pumping diameter of the oil pumping unit, the stroke of the oil pumping unit, the period of the oil pumping unit, an oil gas value ratio and the time accumulation value of the valve core 210 in the upward movement state during the down stroke;

$$Q_{Down}(i) = \frac{\pi d^2 L t_{2i}}{2T} \times B0 \times 10^{-6} \quad \text{Formula 2}$$

wherein, Qdown(i) is the liquid production capacity of the oil pumping unit during the down stroke at the i time, and the unit is m3, d is the diameter of the oil pumping rod and the unit is mm, L is the stroke of the oil pump and the unit is m;

t2i is the time accumulation value of the valve core 210 which is in the upward movement state during the down stroke of the oil pumping unit at the i time, and the unit is s, T is the period of the oil pumping unit; and the unit is s; and B0 is the oil gas volume ratio.

(7) the liquid production capacity of the oil well of the oil pumping unit in a single period can be calculated based on a. Formula 3, which is obtained by combining Formula I and Formula 2:

$$Q(i) = \frac{\pi L B0}{2T} \times (D^2 t_{1i} + d^2 t_{2i}) \times 10^{-6} \quad \text{Formula 3}$$

wherein, Q(i) is the liquid production capacity of the oil pumping, unit in the i period, and the unit is m3;

D is the pumping diameter of the oil pumping unit, and the unit is mm;

d is the diameter of the oil pumping rod and the unit is mm;

L is the stroke of the oil pumping unit and the unit is m;

T is the period of the oil pump and the unit is s;

B0 is the oil gas volume ratio;

t1i is the time accumulation value of the valve core 210 which is in the upward movement state during the up stroke of the oil pumping unit the i time, and the unit is s; and t2i is the time accumulation value of the valve core 210 which is in the upward movement state during the down stroke of the oil pumping unit at the i time, and the unit is s;

(8) the daily liquid production capacity of the oil well can be calculated through Formula 4 based on the liquid production capacity of the oil pumping unit in a single period;

$$Q = \sum_{i=1}^{i=M} Q(i) \qquad \text{Formula 4}$$

wherein, Q is the daily liquid production capacity of the oil well, and the unit is m3;

Q(i) is the liquid production capacity of the oil well when the oil pumping unit is in the i-th period, and the unit is m3; and M is the number of periods of the oil pumping unit within a day.

The working state of the oil pump can be judged by using the calculated liquid production capacity; and the work state includes pump leakage, oil pipe leakage, pump clamping, and well stop.

According to the calculation methods abovementioned, the one-way flow detection device can calculate the liquid production capacity of the oil well in real time and can calculate the daily liquid production capacity of the oil well automatically; the pump clamping or well stop of the oil well can be determined through the liquid production capacity of the oil well calculated in real time; if the liquid production capacity of the oil well is always zero within a period of time and no liquid is output by the oil well, a person can judge that the oil well is in pump clamping or well stop; the work state of the oil well is determined based on a contrast condition of the current daily liquid production capacity and the previous day's liquid production capacity; supposing that the current daily liquid production capacity is less than 30% of the previous day's liquid production capacity, the oil pump is judged to be in pump leakage or pipe leakage; and in the practical application, different proportions are set based on different oil well working parameters to ensure the precision of alarms.

When the invention is in an actual application, the oil-water-gas mixed liquid in the stratum layer is pumped to the ground surface through an oil pumping unit, flows to the device through the oil pipe, and enters the interior from the liquid inlet 207 of the device; whether the oil pumping unit is in the down stroke or the up stroke can be judged automatically by the signal processing unit 108 through the period signal detection unit 106; during the up stroke process of the oil pumping unit, the mixed liquid pumped from the stratum layer is gradually increased, the pressure between the oil pipe and the One-way flow monitoring device is increased continuously; when the pressure reaches a certain degree, the liquid in the lower part of the valve core 210 supports the valve core 210 and the valve core 210 moves upwards; the valve core 210, when moving, delivers the pushing force to the rubber shock absorption cushion 208, the indicating rod 206 and the spring 214 sequentially; the indicating rod 206 is in threaded connection with the rubber shock absorption cushion 208; the spring 214 penetrates the indicating rod 206; one end of the spring 214 is in contact with the cover plate 205 while the other end thereof is in contact with the rubber shock absorption cushion 208; when the pressure at the bottom of the valve core 210 is smaller than the pressure at the upper part of the valve core 210, the valve core 210 is pressed downwards to the valve base 209 under the action of the spring 214 so as to seal the valve core 210 and the valve base 209, thereby preventing the liquid from flowing into the liquid inlet 207 inversely from the liquid outlet 212 of the device; the indicating rod 206 can penetrate the cover plate 205 freely; as the valve core position detection unit 105 in the embodiment detects the movement condition of the valve core 210 by adopting the Hall sensor principle, one magnet 204 is arranged at the top part of the indicating rod 206; the magnet 204 can move freely up and down in the valve core stroke cavity 217 rather than penetrating the cover plate 205; the valve core position detection unit 105 is installed in the detecting hole 202; in order to adjust the detection distance between the valve core position detection unit 105 and the magnet 204 conveniently, the valve core position detection unit 105 is fixed at one metal rod; the position adjustment can be done only by moving the metal rod upwards and downwards; the valve core stroke cavity 217 and the valve cavity 213 are communicated with each other and their pressure is kept consistent; after the valve core 210 moves upwards, the signal processing unit 108 detects the upward movement information of the valve core 210 through the valve core position detection unit 105; a timer in the signal processing unit 108 is started to count the upward movement time of the valve core 210; after flowing into the valve cavity 213, the liquid flows into an oil pipeline through the liquid outlet 212, when the pressure at the bottom of the valve core 210 is smaller than the pressure at the upper part of the valve core 210, the valve core 210 is pressed downwards to the valve base 209 under the action of the spring 214 so as to seal the valve core 210 and the valve base 209, thereby preventing the liquid from flowing into the liquid inlet 207 inversely from the liquid outlet 212 of the device; the signal processing unit 108 obtains the downward movement information of the valve core 210 through the valve core position detection unit 105, stops the counting of the timer at the interior and calculates the liquid production capacity of the oil pumping unit during the up stroke based on Formula 1; during the down stroke of the oil pumping unit, a case where the oil pumping rod enters the mixed liquid may also result in liquid output of the oil well; the liquid enters the liquid inlet 207 of the One-way flow monitoring device from the oil pipe, the liquid at the liquid inlet 207 is compressed and pressurized, and the valve core 210 moves upwards when a force value which enables the valve core 210 to move upwards is reached, and the valve core position detection unit 105 detects the upward movement state of the valve core 210; the signal processing unit 108 collects the time accumulation value of the valve core 210 during the upward movement state in real time through the valve core position detection unit 105; the time specific value taken by the liquid output of the oil pump in the single period is calculated by dividing the time accumulation value of the valve core 210, which is in the upward movement state, and the period of the oil pumping unit; an efficient stroke for the liquid inlet of the oil pumping unit is calculated based on the time specific value; and the single liquid production capacity during the down stroke of the oil pumping unit can be calculated according to Formula 2 based on the pumping diameter of the oil pumping unit, the stroke of the oil pumping unit, the period of the oil pumping unit, an oil gas value ratio and the time accumulation value of the valve core 210 in the upward movement state during the down stroke; the liquid production capacity of the oil pumping unit in a single period can be calculated based on Formula 1 and Formula 2; the daily liquid production capacity of the oil well can be calculated based on Formula 4; whether the oil well is in pump leakage, oil pipe leakage, pump clamping and well stop can be judged based on the change condition of the liquid production capacity; meanwhile, the valve core 210 and the valve base 209, which are made of stainless steel and ceramic materials, can prevent corrosion, so that the service life of the device is prolonged greatly, and the on-site maintenance is reduced.

When the mixed liquid flows through the valve cavity 213, the pressure detection unit 103 installed at the fixing hole 210 collects the pressure data in the valve cavity 213 in real time and transmits the collected data to the signal processing unit 108; the temperature detection unit 101 installed in the detecting hole 203 can detect the temperature of the liquid in the valve body 211 in real time and can transmit the data to the signal processing unit 108; the signal processing unit 108 receives and processes the signals from the pressure detection unit 103, the temperature detection unit 101 and the valve core position detection unit 105, stores the collected data in the data storage unit 108 to prevent data loss, displays the collected data in real time through the data display unit 107 so as to bring convenience to check, and also can send out the collected data wirelessly through the wireless transmission unit 110; the vibration detection unit 103 connected with the signal processing unit 108 detects the vibration condition of the valve core 210 when the device is in a working state in real time; when the valve core 210 vibrates regularly, the signal processing unit 108 determines the device works normally by default, and the vibration detection unit 103 can serve as an auxiliary function for detecting the working state of the device; in order to prevent the protective cover 218 of the deice from being damaged or stolen, the anti-disassembly detection unit 104 is arranged at the mounting hole; the anti-disassembly detection unit 104 can realize the function by adopting a micro-switch; a limiting switch and the Hall sensor; the anti-disassembly detection unit 104 is connected with the signal processing unit 108; when the protective cover 218 is installed normally, the output signal of the anti-disassembly detection unit 104 is at a high electric level, and the signal processing unit 108 considers that the protective cover 218 is installed normally; when the protective cover 218 has man-made damage or is stolen, the anti-disassembly detection unit 104 outputs a low electric level to the signal processing unit 108, the signal processing unit 108, after detecting the information, stores the information in the data storage unit 109, displays the information in the data display unit 107, and sends out the information wirelessly to prompt a monitoring person to discover and process the situation in time, thereby preventing the data collection part at the interior of the protective cover 218 from being damaged and resulting in a bigger loss, in order to bring convenience to maintenance in the later period, the protective cover 218 can be disassembled and replaced directly from the bottom base 215, the bottom base 215 is fixed with the valve body 211 through screw threads, and the valve base 209 and the valve core 210 can be replaced directly; and different valve cores and different valve bases 209 can be replaced based on the liquid production capacity condition of the oil well, so that the adaptability of products is enlarged. In addition, the power module 111 provides the power source required for working to the temperature detection unit 101, the vibration detection unit 102, the pressure detection unit 103, the anti-disassembly detection unit 104, the valve core position detection unit 105, the period signal detection unit 106, the wireless transmission unit 110, the data storage unit 109, the data display unit 107, and the signal processing unit 108.

Figure 3:
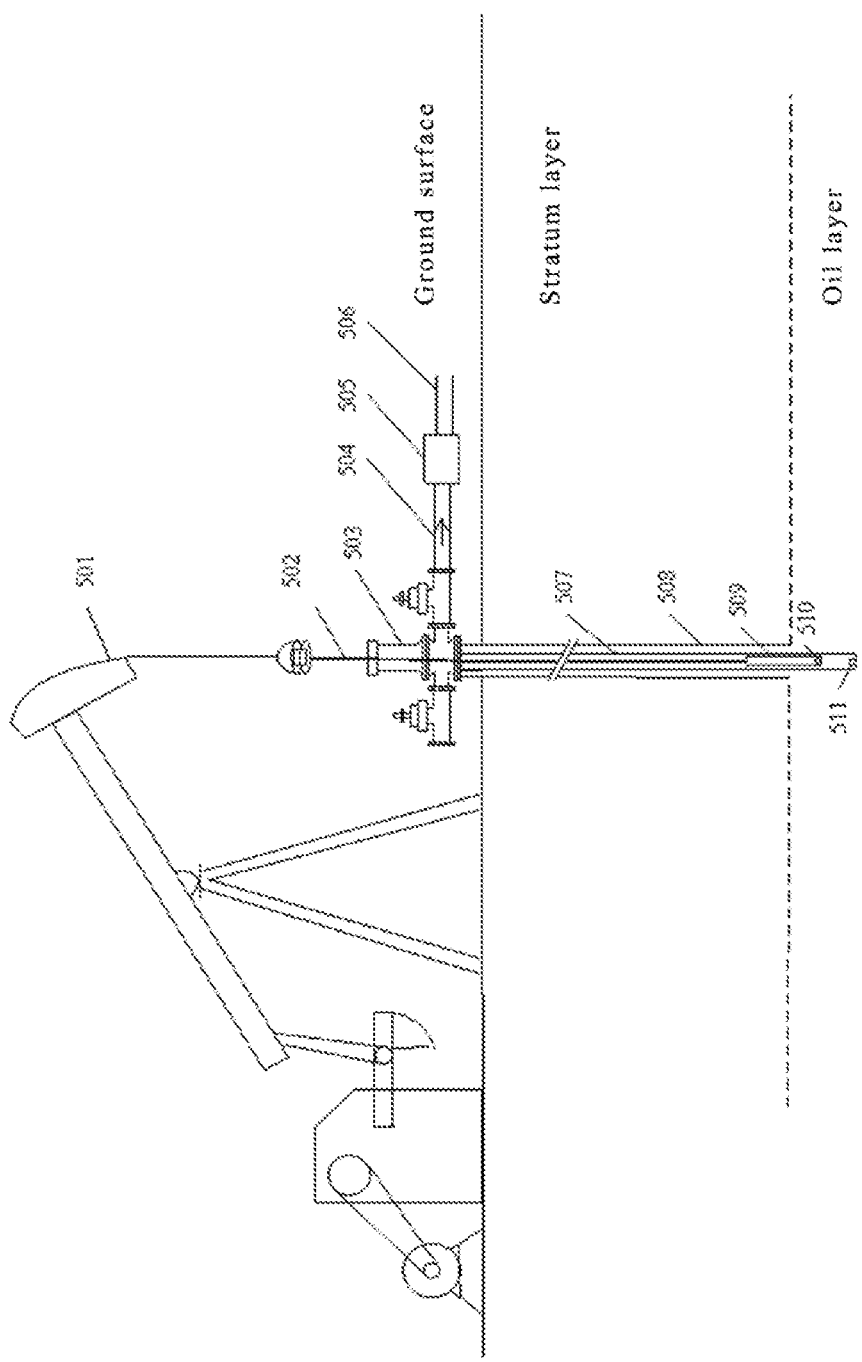
FIG. 3 shows a schematic diagram of a working process of an oil pumping unit.

The embodiment as shown in the FIG. 3 has the basic working process as follows: an oil pumping unit 501 in a running process is connected with a oil pump 509 in the oil layer through the oil pumping rod 502, thereby driving the oil pump 509 to perform up and down reciprocation movement in the stratum layer and the oil layer; the liquid pumped from the oil layer enters the device 505 through the oil pipe 507 at the stratum layer, an oil extraction tree 503 and an oil pipe 504 at the ground surface; and after the liquid production capacity of the oil well is monitored and metered by the device 505, the liquid flows into an oilfield oil transmission pipe 506.

The specific working process is as follows: when the oil pump 509 moves upwards, a traveling valve 510 is closed under the pressure action of the liquid column above the oil pump 509 in the oil pipe 507 at the stratum layer; in the process where the oil pump moves upwards continuously, the liquid above the oil pump 509 enters the oil pipe 504 at the ground surface gradually and flows to the device 505; as the oil pump 509 goes upstream, the pressure in the oil pipe 507 at the ground surface increases continuously and finally lifts up the valve core in the device 505, and the liquid flows through the device 505; when the liquid lifts up the valve core of the device 505, the timer is started for timing; when the valve core drops to the original position, the timer is stopped, and the single liquid production capacity of the oil pumping unit during the up stroke can be calculated according to Formula 1 based on the time accumulation value of the valve core in the upward movement state:

$$Q_{U_p}(i) = \frac{\pi D^2 L t_{1i}}{2T} \times B0 \times 10^{-6} \qquad \text{Formula 1}$$

wherein, Qup(i) is the liquid production capacity of the oil pumping unit during the up stroke at the i time, and the unit is m3;

D is the pumping diameter of the oil pumping unit and the unit is mm;

L is the stroke of the oil pump and the unit is m;

t1i is the time accumulation value of the valve core 210 which is in the upward movement state during the up stroke of the oil pumping unit at the i time, and the unit is s;

T is the period of the oil pumping unit, and the unit is s; and

B0 is the oil gas volume ratio.

As the pressure in the pump cylinder of the oil pump 509 drops, a fixed valve 511 is lifted up by the liquid column in the annular space of the oil pipe 507 at the stratum layer and a casing pipe 508, and the liquid in the oil well enters the pump cylinder of the oil pump 509 to fill with the space which is abdicated by the upward movement of the oil pump 509.

When the oil pump 509 moves downwards, the fixed valve 511 is closed as the liquid columns in the pump cylinder of the oil pump 509 is pressurized and the pressure is increased. The oil pump 509 moves downwards continuously, the pressure in the oil pump 509 rises continuously; when the pressure in the pump cylinder of the oil pump 509 is beyond the pressure of the liquid column in the oil pipe 507 at the stratum layer, the travelling valve 510 is open, the liquid enters the oil pipe 507 at the stratum layer from the oil pump 509; along with the entering of the liquid, the pressure in the oil pipe 507 at the stratum layer rises continuously, a portion of the liquid may enters the oil pipe 504 at the ground surface to lift up the valve core of the device 505, and the liquid flows through the device 505; when the valve core of the device 505 is lifted up, the timer is started for timing; when the valve core drops to the original position, the timer is stopped; and the single liquid production capacity of the oil pumping unit during the down stroke can be calculated according to Formula 2 based on the time accumulation value of the valve core in the upward movement state:

$$Q_{Down}(i) = \frac{\pi d^2 L t_{2i}}{2T} \times B0 \times 10^{-6} \quad \text{Formula 2}$$

wherein, Qdown(i) is the liquid production capacity of the oil pumping unit during the down stroke at the i time, and the unit is m3;

d is the diameter of the oil pumping rod and the unit is mm;

L is the stroke of the oil pump and the unit is m;

t2i is the time accumulation value of the valve core 210 which is in the upward movement state during the down stroke of the oil pumping unit at the i time, and the unit is s;

T is the period of the oil pumping unit, and the unit is s; and

B0 is the oil gas volume ratio.

the liquid production capacity of the oil well of the oil pumping unit in a single period can be calculated based on Formula 3 which is obtained by combining Formula 1 and Formula 2:

$$Q(i) = \frac{\pi L B0}{2T} \times (D^2 t_{1i} + d^2 t_{2i}) \times 10^{-6} \quad \text{Formula 3}$$

wherein, Q(i) is the liquid production capacity of the oil pumping unit in the i period, and the unit is m3;

D is the pumping diameter of the oil pumping unit, and the unit is mm;

d is the diameter of the oil pumping rod and the unit is mm;

L is the stroke of the oil pumping unit and the unit is m;

T is the period of the oil pump and the unit is s;

B0 is the oil gas volume ratio;

t1i is the time accumulation value of the valve core which is in the upward movement state during the up stroke of the oil pumping unit at the i time, and the unit is s; and t2i is the time accumulation value of the valve core which is in the upward movement state during the down stroke of the oil pumping unit at the i time, and the unit is s.

The daily liquid production capacity of the oil well can be calculated through Formula 4 based on the liquid production capacity of the oil pumping unit in a single period;

$$Q = \sum_{i=1}^{i=M} Q(i) \quad \text{Formula 4}$$

wherein, Q is the daily liquid production capacity of the oil well, and the unit is m3;

Q(i) is the liquid production capacity of the oil well when the oil pumping unit is in the i-th period, and the unit is m3; and M is the number of periods of the oil pumping unit within a day.

The device 505 is combined with the oil pump 509; and the method of calculating the liquid production capacity of the oil well is as follows: pumping the liquid in the oil layer to the oil pipe 507 at the ground surface by the oil pump in the upward movement process; enabling the liquid in the oil layer to enter the oil pump 509 in the downward movement process, and so on. The working period of the device 505 is consistent with that of the oil pump 509; when the oil pump 509 moves upwards; the liquid in the oil pipe 507 at the stratum layer enters the oil extraction tree 503 and the oil pipe 507 at the ground surface and flows to the device 505 so as to lift up the valve core of the device 505; when the oil pump 509 moves downwards, the oil pump 509 does not output any liquid, and the valve core drops to the valve base; and as the oil well basically has no liquid output (the liquid output can be ignored), the proportion of the lifting time of the valve core to the period of the oil well can be calculated based on the lifting time of the valve core; the liquid output stroke of the oil pump 509 can be calculated based on the proportion; and the actual liquid production capacity of the oil well can be calculated based on parameters such as the pump diameter of the oil pump 509, the stroke, the crude oil density, and the stroke loss.

Due to a combination of the working modes of the check valve and the oil pump 509, the movement track of the oil pump 509 is calculated by measuring the liquid output time through the check valve, and a new calculation method is provided for calculation of the liquid production capacity of the oil well; the oil pump 509 is a direct mechanism for pumping the liquid in the oil layer; the liquid production capacity of the oil well can be calculated directly through the oil pump 509, so that the calculation precision of the liquid production capacity of the oil well is greatly improved, the mathematical calculation model is simplified, and a large number of manpower and material resources are saved, and far-reaching effects on the calculation mode of the liquid production capacity of the oilfield will result.

What is claimed is:

1. A one-way flow monitoring device, comprising:
   a mechanical part; and
   a data collection part, wherein:
   a liquid inlet and a liquid outlet of the mechanical part of the one-way flow monitoring device are connected in series in a pipeline flow path through a flange or a welding mode according to an oil well pipeline flow path direction;
   the mechanical part is provided with the liquid inlet, the liquid outlet, a valve core, a valve base, a valve body, a valve cavity, a rubber shock absorption cushion, a spring, an indicating rod, a valve core stroke cavity, a cover plate, a bottom base and a protective cover;
   the liquid inlet and the liquid outlet are connected with each other through the valve body;
   the valve base is detachably attached at the interior of the valve body and is in direct connection with the valve body;
   the valve base enables the liquid inlet and the liquid outlet to communicate with each other;
   the cover plate is located at a top part of the valve body, the bottom base is fixedly connected above the cover plate, the bottom base is internally provided with the valve core stroke cavity, and the protective cover is arranged above the bottom base;
   the interior of the valve base forms the valve cavity;
   the valve core, the valve base, the rubber shock absorption cushion, the spring and the indicating rod are located in the valve cavity;
   the valve core is located at the bottom of the valve cavity and is configured to slide up and down in the interior of the valve cavity along an axial line;
   the valve core is in contact sealing with the valve base and is configured to be disassembled from the valve base;

the rubber shock absorption cushion is located at an upper part of the valve core and is in contact with the valve core;

the indicating rod is located at an upper part of the rubber shock absorption cushion and is connected with the rubber shock absorption cushion;

the indicating rod penetrates the spring and the cover plate sequentially and enters the valve core stroke cavity;

the data collection part is arranged at an interior of the protective cover;

the data collection part is provided with a temperature detection unit, a vibration detection unit, a pressure detection unit, an anti-disassembly detection unit, a valve core position detection unit, a period signal detection unit, a wireless transmission unit, a data storage unit and a data display unit;

the temperature detection unit, the vibration detection unit, the pressure detection unit, the anti-disassembly detection unit, the valve core position detection unit, the period signal detection unit, the wireless transmission unit, the data storage unit and the data display unit are separately connected with a signal processing unit, and an independent power module is provided;

the bottom base is provided with a first detecting hole required by the temperature detection unit, a fixing hole required by the pressure detection unit, a second detecting hole required by the valve core position detection unit and a mounting hole required by the anti-disassembly detection unit;

the valve core position detection unit is configured to detect a position of the valve core by using one or more of a combination of sensors in a group including a Hall sensor, a metal detector, a photoelectric switch and a pressure sensor; and the period signal detection unit uses the Hall sensor and ultrasonic waves;

the temperature detection unit is connected with the signal processing unit and is used for detecting a liquid temperature in the valve cavity;

the vibration detection unit is connected with the signal processing unit and is used for detecting a vibration condition of the device;

the pressure detection unit is connected with the signal processing unit and is used for detecting a pressure in the valve cavity;

the anti-disassembly detection unit is connected with the signal processing unit and is used for detecting a disassembly condition of the protective cover;

the valve core position detection unit connected with the signal processing unit is used for detecting a movement condition of the valve core;

the wireless transmission unit is connected with the signal processing unit and is used for realizing wireless data transmission;

the storage unit is connected with the signal processing unit and is used for realizing data storage;

the data display unit is connected with the signal processing unit and is used for displaying the collected data; and the period signal detection unit is connected with the signal processing unit and is used for detecting the period of the oil pumping unit.

2. The device of claim 1, wherein the signal processing unit comprises a PLC and only a single chip.

3. The device of claim 1, wherein the valve core stroke cavity communicates with the valve body through a gap between the cover plate and the indicating rod.

4. The device of claim 1, wherein the detecting hole required by the temperature detection unit does not communicate with the valve cavity.

5. The device of claim 1, wherein the detecting hole required by the valve core position detection unit does not communicate with the valve cavity.

6. The device of claim 1, wherein the rubber shock absorption cushion contacts the valve core under the action of the spring.

7. The device of claim 1, wherein the valve core and the valve base are made of stainless steel and a ceramic material.

8. The device of claim 1, wherein the power module is within the protective cover and is a battery.

9. The device of claim 1, wherein a working state of the oil pump is configured to be judged by using a calculated liquid production capacity; and the work state includes pump leakage, oil pipe leakage, pump clamping, and well stop.

10. The device of claim 1, wherein the power module provides a power source required for working to the temperature detection unit, the vibration detection unit, the pressure detection unit, the anti-disassembly detection unit, the valve core position detection unit, the period signal detection unit, the wireless transmission unit, the data storage unit, the data display unit and the signal processing unit.

11. The device of claim 10, wherein the signal processing unit comprises a PLC and only a single chip.

12. The device of claim 10, wherein the detecting hole required by the temperature detection unit does not communicate with the valve cavity.

13. The device of claim 10, wherein the detecting hole required by the valve core position detection unit does not communicate with the valve cavity.

14. The device of claim 2, wherein the power module is within the protective cover and is a battery.

15. A method for oil well liquid production capacity calculation using the device of claim 1, the method comprising:

(1) distinguishing whether the oil pumping unit is in an upstream or a downstream process through the period signal detection unit;

wherein, in the upstream process of the oil pumping unit, liquid enters the liquid inlet of the one-way flow monitoring device from the oil pipe; when the liquid at the liquid inlet is compressed and pressurized until a force value enabling the valve core moves upwards is realized, the valve core moves upwards; and the upward movement state of the valve core is detected by the valve core position detection unit;

(2) detecting throughout the signal processing unit a time accumulation value of the valve core, wherein the valve core is in an upward movement state, in real time through the valve core position detection unit;

(3) calculating a time specific value taken by the liquid output of the oil pumping unit in a single period by dividing a time accumulation value of the valve core, wherein the valve core is in the upward movement state, and the period of the oil pumping unit calculating an efficient stroke for the liquid inlet of the oil pump based on a time specific value; and calculating a single liquid production capacity during the up stroke of the oil pumping unit according to Formula 1 based on a pumping diameter of the oil pumping unit, the stroke of the oil pumping unit, the period of the oil pumping unit, and oil gas value ratio and the time accumulation value of the valve core in the upward movement state during the up stroke;

$$Q_{U_p}(i) = \frac{\pi D^2 L t_{1i}}{2T} \times B0 \times 10^{-6} \qquad \text{Formula 1}$$

wherein, Qup(i) is the liquid production capacity of the oil pumping unit during the up stroke at the i time, and the unit is m3;
D is the pumping diameter of the oil pumping unit and the unit is mm;
L is the stroke of the oil pump and the unit is m; t1i is the time accumulation value of the valve core which is in the upward movement state during the up stroke of the oil pumping unit at the i time, and the unit is s; T is the period of the oil pumping unit, and the unit is s; and
B0 is the oil gas volume ratio;
(4) in a downstream process of the oil pumping unit, an oil pumping rod enters a mixed liquid results in a liquid output of the oil well; the liquid enters the liquid inlet of the one-way flow monitoring device through the oil pipe; compressing and pressurizing the liquid at the liquid inlet until the force value enabling the valve core to move upwards is realized; and detecting the upward movement state of the valve core by the valve core position detection unit;
(5) by the signal processing unit detecting the time accumulation value of the valve core, which is in the upward movement state, in real time through the valve core position detection unit;
(6) calculating a time specific value taken by the liquid output of the oil pumping unit in a single period by dividing the time accumulation value of the valve core in the upward movement state and the period of the oil pumping unit; an efficient stroke for the liquid inlet of the oil pump is calculated based on the time specific value; and calculating a single liquid production capacity during the down stroke of the oil pump according to Formula 2 based on a pumping diameter of the oil pumping unit, a stroke of the oil pumping unit, a period of the oil pumping unit, an oil gas value ratio and the time accumulation value of the valve core in the upward movement state during the down stroke;

$$Q_{Down}(i) = \frac{\pi d^2 L t_{2i}}{2T} \times B0 \times 10^{-6} \qquad \text{Formula 2}$$

wherein, Qdown(i) is the liquid production capacity of the oil pumping unit during the down stroke at the i time, and the unit is m3:
d is the diameter of the oil pumping rod and the unit is mm;
L is the stroke of the oil pump and the unit is m;
t2i is the time accumulation value of the valve core which is in the upward movement state during the down stroke of the oil pumping unit at the i time, and the unit is s;
T is the period of the oil pumping unit, and the unit is s; and
B0 is the oil gas volume ratio;
(7) the liquid production capacity of the oil well of the oil pumping unit in a single period is configured to be calculated based on a Formula 3, which is obtained by combining Formula 1 and Formula 2:

$$Q(i) = \frac{\pi L B0}{2T} \times (D^2 t_{1i} + d^2 t_{2i}) \times 10^{-6} \qquad \text{Formula 3}$$

wherein, Q(i) is the liquid production capacity of the oil pumping unit in the i period, and the unit is m3;
D is the pumping diameter of the oil pumping unit, and the unit is mm;
d is the diameter of the oil pumping rod and the unit is mm;
L is the stroke of the oil pumping unit and the unit is m;
T is the period of the oil pump and the unit is s;
B0 is the oil gas volume ratio;
t1i is the time accumulation value of the valve core 210 which is in the upward movement state during the up stroke of the oil pumping unit at the i time, and the unit is s; and
t2i is the time accumulation value of the valve core 210 which is in the upward movement state during the down stroke of the oil pumping unit at the i time, and the unit is s:
(8) the daily liquid production capacity of the oil well is configured to be calculated through Formula 4 based on the liquid production capacity of the oil pumping unit in a single period;

$$Q = \sum_{i=1}^{i=M} Q(i) \qquad \text{Formula 4}$$

wherein, Q is the daily liquid production capacity of the oil well, and the unit is m3;
Q(i) is the liquid production capacity of the oil well when the oil pumping unit is in the i-th period, and the unit is m3; and
M is the number of periods of the oil pumping unit within a day.

* * * * *